(No Model.)
H. E. HOUSE.
VELOCIPEDE.
No. 388,043. Patented Aug. 21, 1888.
Fig. 1.
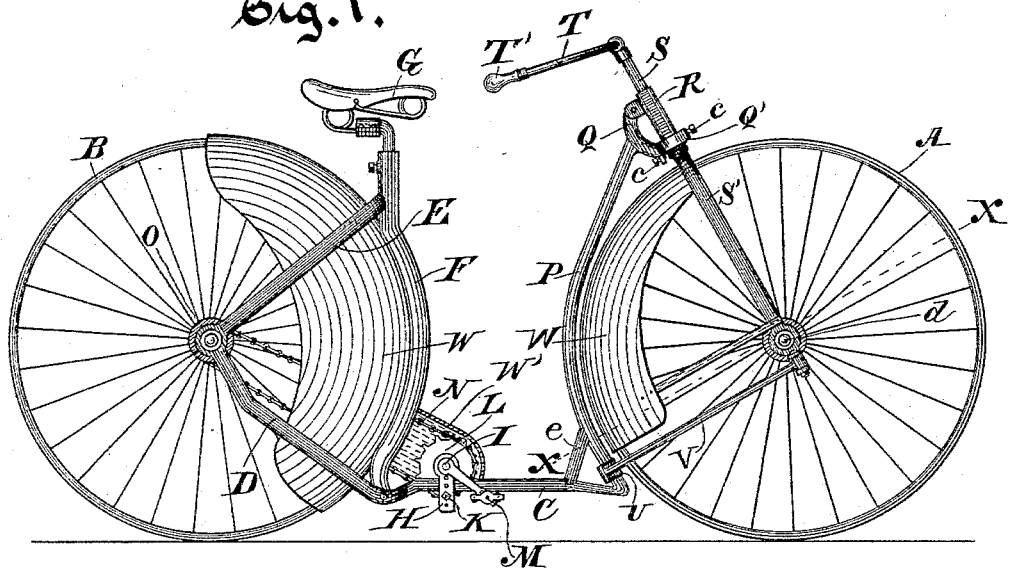
Fig. 2.
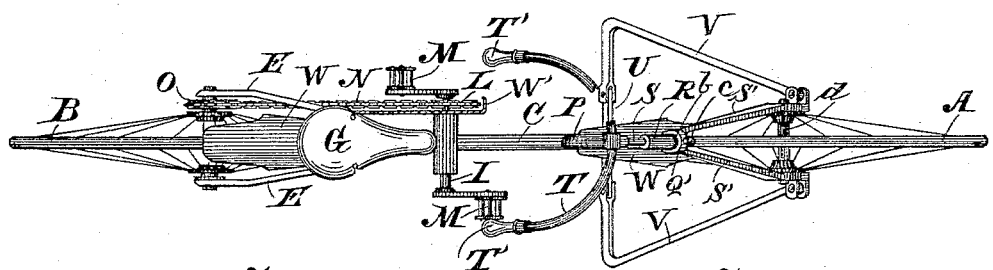
Fig. 3.    Fig. 4.
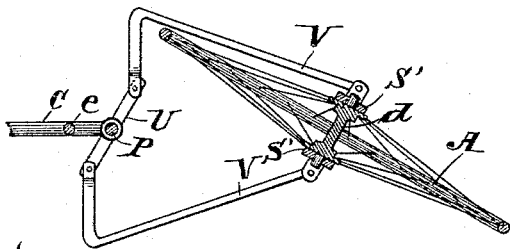    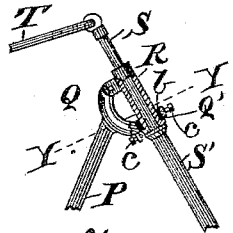
Witnesses.    Inventor.
Fig. 5.    Herbert E. House
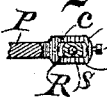

UNITED STATES PATENT OFFICE.

HERBERT E. HOUSE, OF NEENAH, WISCONSIN.

VELOCIPEDE.

SPECIFICATION forming part of Letters Patent No. 388,043, dated August 21, 1888.

Application filed April 2, 1888. Serial No. 269,362. (No model.)

*To all whom it may concern:*

Be it known that I, HERBERT E. HOUSE, of Neenah, in the county of Winnebago and State of Wisconsin, have invented new and useful Improvements in Velocipedes; and I do hereby declare the following to be a full, clear, and exact description of said invention, reference being had to the accompanying drawings, and to the letters or figures of reference marked thereon, which form a part of this specification.

The special object of my invention is to provide a velocipede, and particularly a bicycle, of such form and construction as will adapt the vehicle for the use of ladies or others who object to mounting a high velocipede.

My invention is especially well adapted for use with a bicycle, and I have shown it in the drawings in connection with a bicycle only; but, with such slight variations in form as will occur to any mechanic, it can be readily adapted for use with a tricycle or other form of velocipede.

In the drawings, Figure 1 is a perspective view of a bicycle embodying my invention. Fig. 2 is a plan view of the same. Fig. 3 is a plan cross-section of the forward part of the bicycle on line X X of Fig. 1. Fig. 4 is a detail of the fitting and adjustment of the tiller in the frame or backbone. Fig. 5 is a cross-section on line Y Y of Fig. 4.

The same letters refer to like parts in all the views.

In the drawings, A is the front or steering wheel, and B is the rear or supporting wheel. The two wheels are connected together and combined in one mechanism by means of a frame, which is preferably constructed mostly of hollow tubes, the part C of which frame, occupying the space between the two wheels, is depressed near the ground.

In this bicycle the frame at its rear end is made bifurcate, and the two arms D D at their rear ends are made the bearings for the axle of the wheel B. For strength, two other arms, E E, integral with the arms D D, projecting upwardly and forwardly from the rear end of the arms D D, come together and unite in the upright F, which upright F is secured at its lower end to the frame at the front end of the arms D D, and at its upper end supports the saddle G. A bracket, H, is secured to the part C of the frame, and in its upper end is provided with bearings for the treadle-axle I. This bracket H is made bifurcate, and is adapted to be adjustable vertically and horizontally on the part C by means of a series of apertures, through which a bolt, K, passes, which bolt is provided with a screw-thread and nut for clamping the bracket H securely to the part C, and which bolt, being adapted to fit the several sets of apertures in the bracket, makes the bracket capable of being adjusted up or down, as desired; and this bracket may be moved up or down or forward and back any distance desired without reference to the distance apart of the apertures therein, for the clamping-bolt passes only through the two arms of the bracket and clamps those arms against the part C, whereby any adjustment whatever may be made.

The axle I carries rigid thereon a sprocket-wheel, L, and two treadles, M M. A chain, N, runs upon the sprocket-wheel L, and also on another sprocket-wheel, O, rigid to the hub of the wheel B, whereby the power applied on the treadles M M is transferred to the wheel, whereby it may be caused to rotate.

At the front end of the part C of the frame an upright, P, is secured to the part C or made integral therewith, the upper extremity of which upright is made bifurcate, the upper arm, Q, of which bifurcation is pivoted to a sleeve, R, which sleeve R fits movably upon the tiller-shank S. The lower arm, Q', is provided with a longitudinal slot, $b$, in which the sleeve R is received and has slight movement front and rear. The length of this slot $b$ may be reduced and adjusted by means of the adjusting thumb-screws $c$ $c$, turning through the arm Q' at front and rear, respectively. The tiller S is made bifurcate at its lower end, forming the forks S' S', the lower ends of which forks are provided with bearings for the axle $d$ of the front wheel, A. The upper extremity of the tiller S is provided with a handle-bar, T, and handles T' T'. A short strengthening-brace, $e$, is preferably inserted between the part C and the upright P. A cross-bar, U, is centrally pivoted to the frame, and this cross-bar U is connected at both its ends to the lower ends of the forks S' S' by the connecting-rods V V. These connecting-rods V V, I preferably construct of a bent form, somewhat as shown in Figs. 2 and 3, to provide room for the movement of the wheel in turning to the right or left. I also prefer to have the pivotal points between the connecting-rods V V and the cross bar U at the same distance apart as the distance from the pivotal point of the rod V with the fork S' on one side from the pivotal point of the rod V with the fork S' on the other side of the wheel, so that the movements of the axle $d$ and the cross-bar U will be parallel with each other; but the cross-bar U can be made longer, and the connecting-rods V V can be pivoted or hinged to the cross-bar U at distances farther from each other than the length of the axle D, and the mechanisms will operate satisfactorily, the slot $b$ in the arm Q' being adapted to allow such movement of the tiller S with reference to the upright P as would be obtained with such longer cross-bar U. I have placed shields W W and W' over the wheels and driving mechanism to protect them against contact with the skirts of a dress.

For use by ladies it is very convenient to have the sprocket-wheel L and the attached mechanism located at as low a point as possible, and when the pavement is smooth this can be accomplished by letting down the sprocket-wheel by means of the adjustable bracket H to the lowest possible point; but when the road is rough the mechanism must necessarily be raised somewhat in order to avoid the elevations in the road, and with a longer or shorter chain the wheel can be moved forward or back to accommodate ladies or gentlemen. If the axle $d$ is rigid in the forks S' S', the rods V V may be pivoted to the ends of the axle $d$. The object is to pivot these connecting-rods V V at or near the center of the wheel A, so that the driving force from the rear wheel may be delivered to the forward wheel as near its axis as possible. I have not shown any brake or bell or steps, or other of the numerous attachments for a velocipede, as they embody no part of my invention.

What I claim as new, and desire to secure by Letters Patent, is—

1. In a velocipede, a cross-bar, U, centrally pivoted to the frame, with two connecting-rods, V V, and tiller S, the connecting-rods V V being each pivoted at one end to the cross-bar U and at the other end to the axle or a fork of the tiller, the points at which the rods V V are pivoted to the cross-bar U being the same distance from each other as the points at which these rods are pivoted to the axle or the forks of the tiller, substantially as described.

2. In a velocipede, an upright, P, having an arm, Q, pivoted to a sleeve, R, the sleeve R, and the tiller S, with the arm Q' of the upright P, having a slot, $b$, substantially as and for the purpose set forth.

3. The combination of the tiller S, sleeve R, upright P, pivoted to the sleeve R, and arm Q', provided with slot $b$, with connecting-rods V V and cross bar U, pivoted on the frame, all arranged and connected substantially as described.

4. In a velocipede, a sprocket-wheel, I, supported in a bracket, H, and the bracket H, secured adjustably to the horizontal part C of the frame by means of a bolt, K, adapted to be inserted in any set of the many apertures in said bracket H, whereby said sprocket-wheel I may be adjusted horizontally and vertically, substantially as described.

In testimony whereof I affix my signature in presence of two witnesses.

HERBERT E. HOUSE.

Witnesses:
J. SHIELLS,
ALX. McNAUGHTON.